(12) United States Patent
Jo (10) Patent No.: US 11,346,417 B2
(45) Date of Patent: May 31, 2022

(54) ELECTRONIC BRAKE APPARATUS

(71) Applicant: HYUNDAI MOBIS CO., LTD., Seoul (KR)

(72) Inventor: Chi Hoon Jo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 302 days.

(21) Appl. No.: 16/814,796

(22) Filed: Mar. 10, 2020

(65) Prior Publication Data

US 2021/0123490 A1    Apr. 29, 2021

(30) Foreign Application Priority Data

Oct. 29, 2019   (KR) .......................... 10-2019-0135010

(51) Int. Cl.
| | |
|---|---|
| *F16D 51/48* | (2006.01) |
| *F16D 65/22* | (2006.01) |
| *B60T 13/74* | (2006.01) |
| *F16H 25/20* | (2006.01) |
| *B60T 1/06* | (2006.01) |
| *F16D 51/20* | (2006.01) |
| *F16D 121/24* | (2012.01) |
| *F16D 125/40* | (2012.01) |
| *F16D 125/52* | (2012.01) |
| *F16D 127/02* | (2012.01) |

(52) U.S. Cl.
CPC ............ *F16D 65/22* (2013.01); *B60T 13/743* (2013.01); *B60T 13/746* (2013.01); *F16H 25/20* (2013.01); *B60T 1/067* (2013.01); *F16D 51/20* (2013.01); *F16D 2121/24* (2013.01); *F16D 2125/40* (2013.01); *F16D 2125/52* (2013.01); *F16D 2127/02* (2013.01); *F16H 2025/209* (2013.01); *F16H 2025/2084* (2013.01)

(58) Field of Classification Search
CPC .......... F16D 51/48; F16D 65/14; F16D 65/22; F16D 65/24; F16D 65/56; F16D 65/562; B60T 13/74
USPC ......................................... 188/154, 156, 162
See application file for complete search history.

(56) References Cited

U.S. PATENT DOCUMENTS

2006/0278477 A1* 12/2006 Balz ...................... F16D 51/48
                                                          188/156
2007/0151818 A1*  7/2007 Linhoff .................. F16D 51/48
                                                          188/162
2021/0190159 A1*  6/2021 Bach ...................... F16D 65/56

FOREIGN PATENT DOCUMENTS

DE    102004049434 A1    10/2005
JP       2017-502229 A     1/2017
KR    10-2013-0070746 A     6/2013
(Continued)

OTHER PUBLICATIONS

Office Action of Korean Patent Application No. 10-2019-0135010—8 pages (dated Nov. 26, 2020).
(Continued)

*Primary Examiner* — Christopher P Schwartz
(74) *Attorney, Agent, or Firm* — NovoTechIP International PLLC (57) ABSTRACT

Disclosed herein is an electronic brake apparatus that includes a spring pack, a first piston in which the spring pack is mounted, a bolt screw rotated in conjunction with a motor and having one end in point contact with the spring pack, a fixing member configured to bind the bolt screw to the first piston, and a second piston screwed to the other end of the bolt screw.

12 Claims, 5 Drawing Sheets

(56) References Cited

FOREIGN PATENT DOCUMENTS

KR     10-1787998 B1    10/2017
KR     10-1910854 B1    10/2018

OTHER PUBLICATIONS

Office Action of corresponding German Patent Application No. 102020103869.0—6 pages (dated Jun. 12, 2020).

\* cited by examiner

ELECTRONIC BRAKE APPARATUS

CROSS-REFERENCE TO RELATED APPLICATION

The present application claims priority under 35 U.S.C. § 119(a) to Korean Patent Application No. 10-2019-0135010, filed on Oct. 29, 2019 in the Korean Intellectual Property Office, which is incorporated herein by reference in its entirety.

BACKGROUND

1. Technical Field

Embodiments of the present disclosure relate to an electronic brake apparatus, and more particularly, to an electronic brake apparatus that generates a braking force by driving a motor.

2. Related Art

In general, an electronic brake apparatus operates to restrain the rotation of wheels by means of rotational force of a motor. When the motor is driven to rotate a warm shaft, pistons move toward shoes while a worm wheel engaged with the worm shaft rotates, so that the shoes press disks to operate a brake.

A conventional electronic brake has a structure in which screw nuts are installed inside a pair of left and right pistons and both ends of a bolt screw rotated in conjunction with a motor are screwed to the screw nuts. When an elastic member is installed between each of the screw nuts and the associated one of the pistons to secure and maintain the contact with shoes, the piston is increased in diameter and volume because the bolt screw, the screw nut, and the elastic member are arranged coaxially with the central axis of the piston.

Hence, the enhancement in vehicle performance is limited since the degree of freedom of design is low in size, shape, and layout that can avoid interference when intended to apply other vehicle parts for improving brake performance in a limited space defined between the pair of shoes. Therefore, it is necessary to improve this issue.

The related art of the present disclosure is disclosed in Korean Patent Application Publication No. 2013-0070746 (published on Jun. 28, 2013, entitled "DRUM BRAKE FOR VEHICLE").

SUMMARY

Various embodiments are directed to an electronic brake apparatus that can further improve a degree of freedom of design by miniaturizing a piston in size.

In an embodiment, there is provided an electronic brake apparatus that includes a spring pack, a first piston in which the spring pack is mounted, a bolt screw rotated in conjunction with a motor and having one end in point contact with the spring pack, a fixing member configured to bind the bolt screw to the first piston, and a second piston screwed to the other end of the bolt screw.

The spring pack may include a spring shaft inserted into the first piston and in point contact with the bolt screw, a spring hold protruding radially to be coupled to the spring shaft, a ring plate disposed around the spring shaft, and a spring disposed between the ring plate and the spring hold and supported by the spring hold, the spring elastically pressing the ring plate toward the first piston.

The spring shaft may include a shaft body part, a point contact part protruding hemispherically from one end of the shaft body part and in point contact with the bolt screw, and a hold fastening part having a male thread formed around the shaft body part, the spring hold being screwed to the hold fastening part.

The spring shaft may further include a rotation restraint part formed at the other end of the shaft body part while having a polygonal cross-sectional shape, the rotation restraint part being inserted into a rotation restraint groove formed in the first piston.

The rotation restraint part may be installed to be slidable in the rotation restraint groove, and disposed at a distance from the rotation restraint groove in an axial direction of the first piston.

The first piston may include a piston body part having an accommodation space defined therein for receiving the spring pack, a fixing member installation part recessed radially on an inner diameter portion of the piston body part, the fixing member being installed to the fixing member installation part, and a rotation restraint groove recessed axially on an end of the accommodation space, and installed such that a polygonal end of a spring shaft provided in the spring pack is slidable in the rotation restraint groove.

The bolt screw may include a bolt body part extending across space between the first and second pistons, a spring pack pressing part formed at one end of the bolt body part and in contact with the spring pack, and a moving screw part formed at the other end of the bolt body part and having a male thread so that the moving screw part is screwed to the second piston.

The bolt body part may include a rotational force input portion disposed between the first piston and the second piston, and a movement guide portion formed on the rotational force input portion so that a gear member rotated in conjunction with the motor is slidably coupled to the movement guide portion.

The gear member may include a worm shaft connected to an output shaft of the motor, and a worm wheel installed around the movement guide portion and engaging with the worm shaft, the movement guide portion being slidably coupled to the worm wheel.

The spring pack pressing part may include a ring latch portion protruding radially from one end of the bolt body part and having an edge latched to the fixing member, and a point contact recess portion recessed on the center of the ring latch portion so that a hemispherical end of a spring shaft provided in the spring pack is in point contact with the point contact recess portion.

The point contact recess portion may have a smaller curvature or a larger diameter than the hemispherical end of the spring shaft, and the point contact recess portion may have a hemispherical shape in which it is further recessed toward the center thereof.

The fixing member may have a "C" shape and coupled to an inner diameter portion of the first piston to be protruded inward.

As apparent from the above description, in the electronic brake apparatus according to the present disclosure, the spring pack and the bolt screw are disposed in series inside the first piston in the axial direction thereof. Therefore, the first piston can have a diameter sufficient to receive the spring pack or the bolt screw.

More specifically, compared to the related art having the structure in which the bolt screw, the screw nut, and the elastic member are arranged coaxially with the central axis of the piston, it is not necessary in the present disclosure to form a component corresponding to the screw nut and a screw tab corresponding to the male thread of the bolt screw. Therefore, it is possible to further reduce the diameter of the piston member corresponding to the first piston and miniaturize the piston member in size.

Accordingly, the present disclosure can significantly improve the degree of freedom of vehicle design in arranging vehicle parts in the limited space defined between the pair of shoes, and can apply and upgrade the vehicle parts for improving the brake performance. Therefore, it is possible to further enhance the brake performance of the vehicle.

DETAILED DESCRIPTION

Hereinafter, an electronic brake apparatus will be described with reference to the accompanying drawings through various examples of embodiments. It should be noted that the drawings are not necessarily to scale and may be exaggerated in thickness of lines or sizes of components for clarity and convenience of description. Furthermore, the terms as used herein are terms defined in consideration of functions of the disclosure and may change depending on the intention or practice of a user or an operator. Therefore, these terms should be defined based on the overall disclosures set forth herein.

Figure 1:
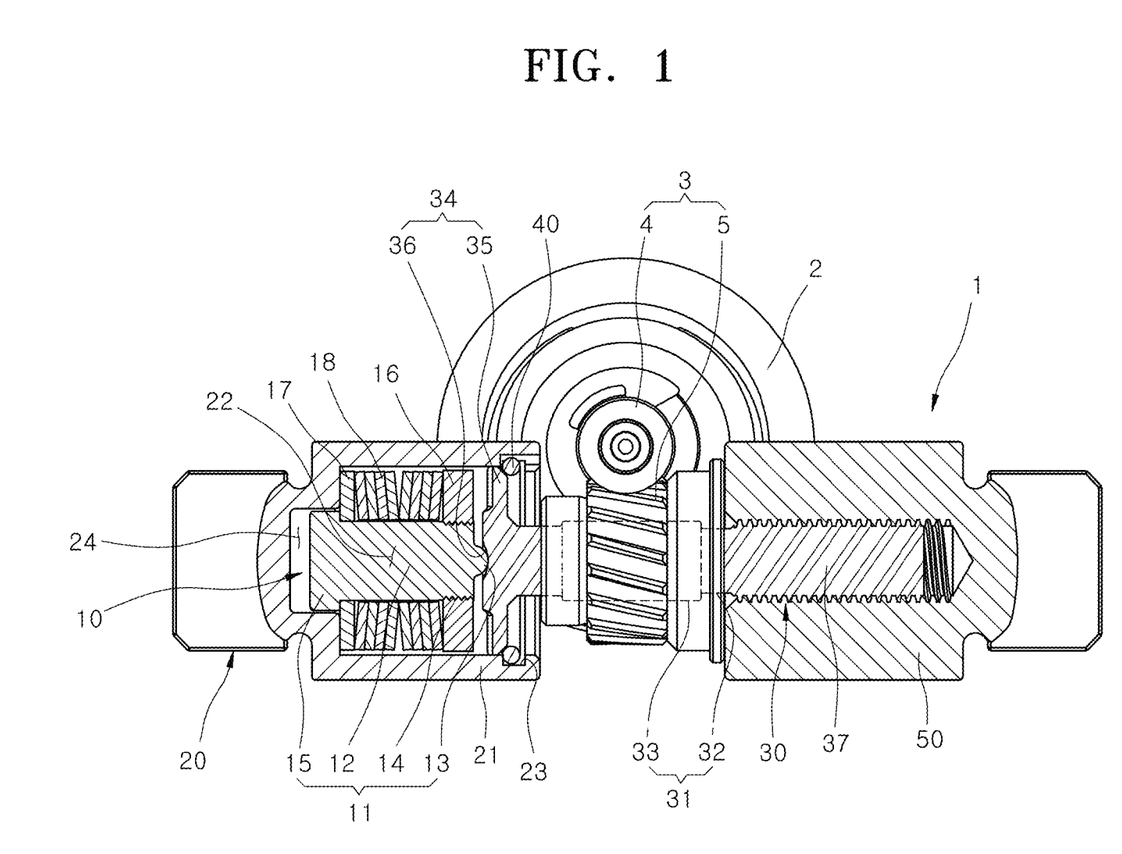
FIG. 1 is a front elevation view schematically illustrating an electronic brake apparatus according to an embodiment of the present disclosure.
Figure 2:
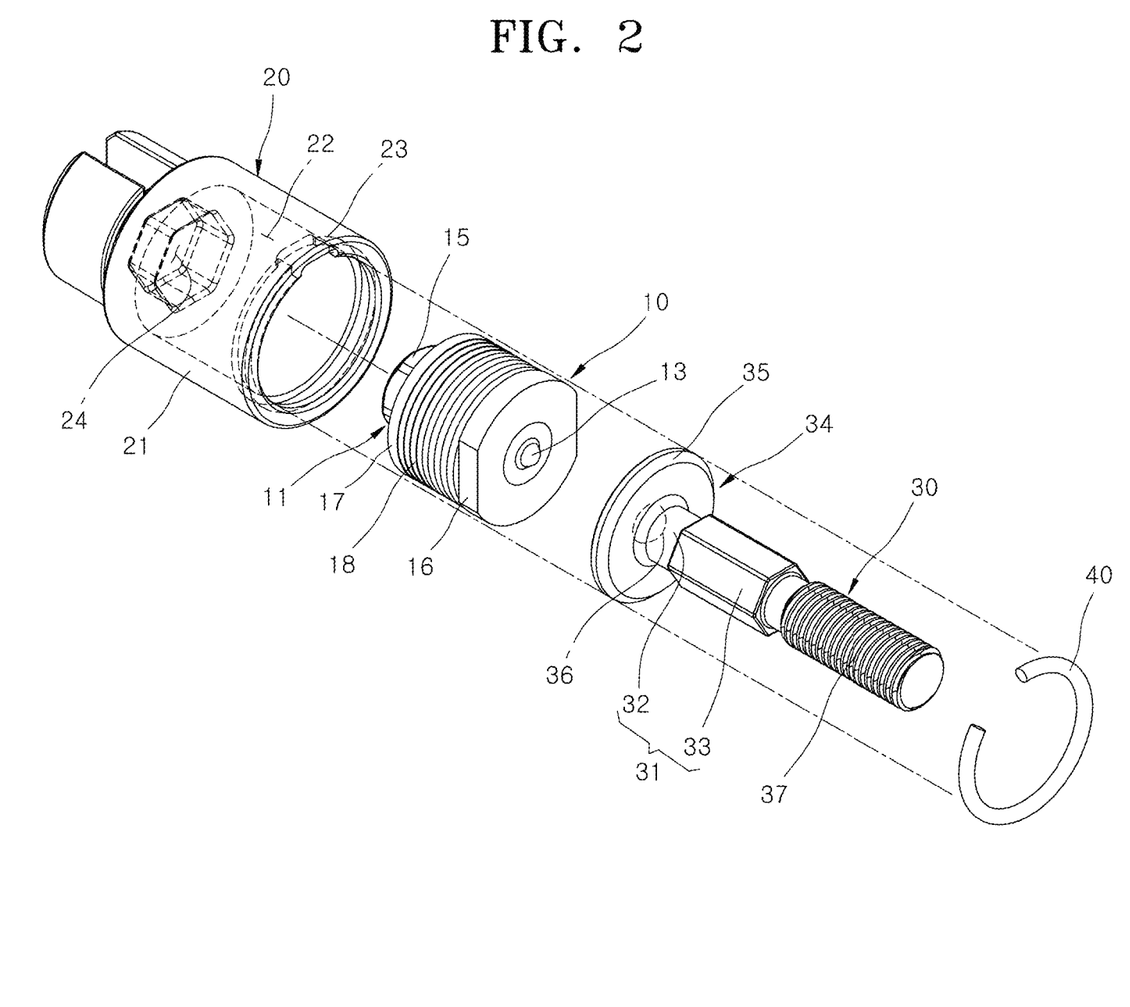
FIG. 2 is an exploded perspective view schematically illustrating main parts of the electronic brake apparatus according to the embodiment of the present disclosure.
Figure 3:
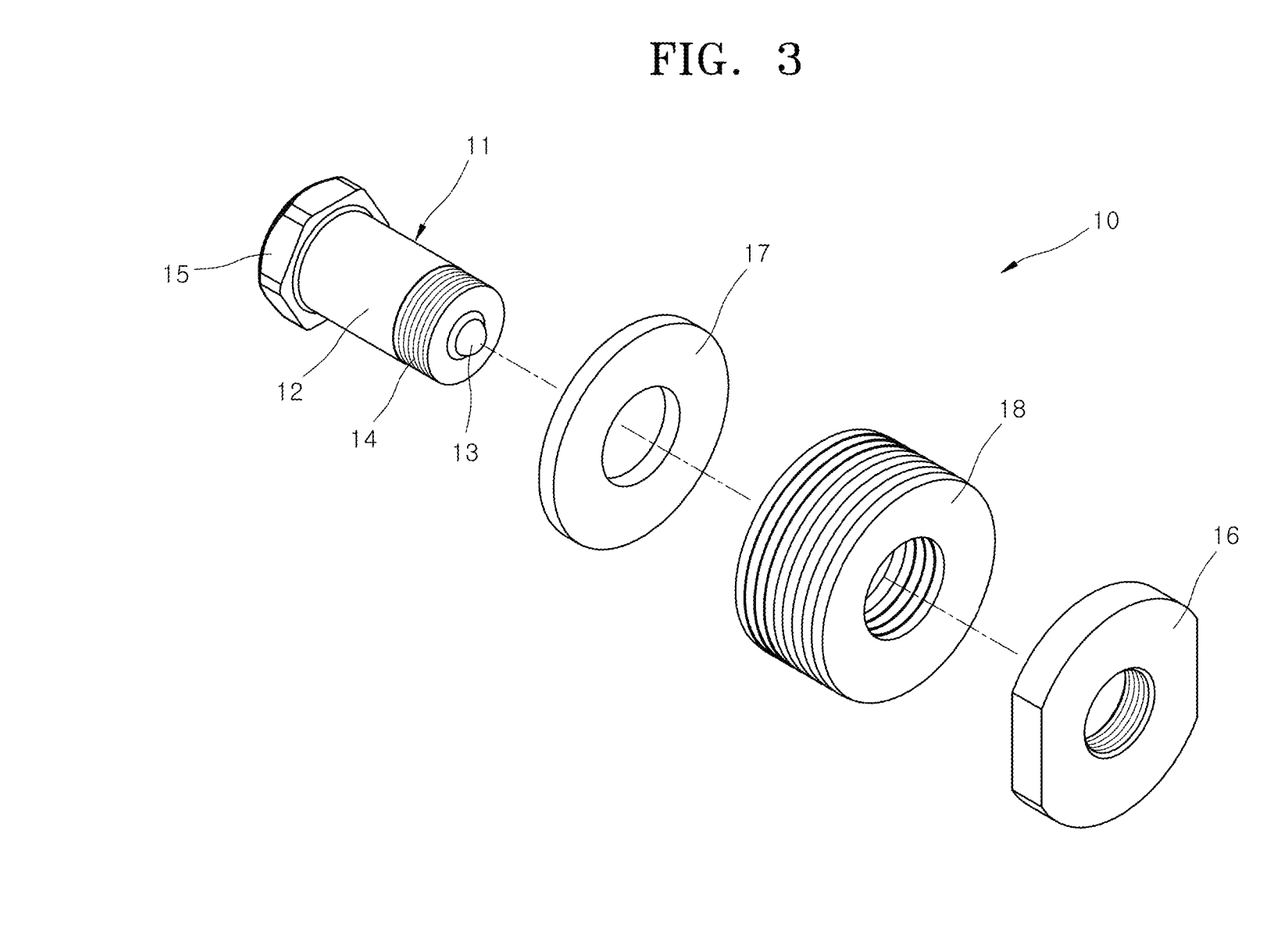
FIG. 3 is an exploded perspective view schematically illustrating main parts of a spring pack of the electronic brake apparatus according to the embodiment of the present disclosure.

FIG. 1 is a front elevation view schematically illustrating an electronic brake apparatus according to an embodiment of the present disclosure. FIG. 2 is an exploded perspective view schematically illustrating main parts of the electronic brake apparatus according to the embodiment of the present disclosure. FIG. 3 is an exploded perspective view schematically illustrating main parts of a spring pack of the electronic brake apparatus according to the embodiment of the present disclosure.

Referring to FIGS. 1 to 3, the electronic brake apparatus, which is designated by reference numeral 1, according to the embodiment of the present disclosure includes a spring pack 10, a first piston 20, a bolt screw 30, a fixing member 40, and a second piston 50.

The spring pack 10 is installed between the bolt screw 30 and the first piston 20 to elastically press the first piston 20 toward an associated shoe 6 based on the bolt screw 30. The elastic force of the spring pack 10 allows the second piston 50 as well as the first piston 20 to come into elastic contact with a respective pair of left and right shoes 6 (see FIGS. 4 and 5).

When a vehicle is parked on a slope, the fine behavior of the vehicle occurs when a driver takes his/her foot off a main brake pedal after operating a parking brake. In this case, disks (not illustrated) rotate together with wheels (not illustrated) while the shoes 6 in contact with the inner sides of the disks also move together. Due to the behavior of the shoes 6, a stroke loss may occur between the first and second pistons 20 and 50 and the shoes 6.

In a situation where the stroke loss may occur by the first and second pistons 20 and 50 being spaced apart from the shoes 6 as described above, the spring pack 10 may elastically push the first and second pistons 20 and 50 toward the shoes 6 in order to prevent the occurrence of the stroke loss. Hereinafter, for convenience of description, left and right directions and forward and rearward directions will be set based on those illustrated in FIG. 1.

The first piston 20 is an element for pressing the left one of the pair of left and right shoes 6 toward the associated disk, and the spring pack 10 is mounted in the first piston 20. The first piston 20 has a shape in which the inside thereof is hollow and the right end thereof facing the second piston 50 is open. The left end of the first piston 20 has a shape of tongs that is in contact with both front and rear of the shoe 6, and is coupled to the shoe 6.

The bolt screw 30 is rotated in conjunction with a motor 2, and has one end in point contact with the spring pack 10. The bolt screw 30 is disposed to extend in the left and right directions across the first and second pistons 20 and 50, and both ends thereof are bound to the respective first and second pistons 20 and 50. The motor 2 transmits a rotational force to the bolt screw 30 disposed between the first piston 20 and the second piston 50 via a gear member 3.

The fixing member 40 binds the bolt screw 30 to the first piston 20. The fixing member 40 has a C-ring shape, and protrudes inward to be coupled to the inner diameter portion of the first piston 20. The fixing member 40 may be tightly installed to the inner diameter portion of the first piston 20 by releasing the force applied to the fixing member 40 after inserting the fixing member 40 into the first piston 20 with the fixing member 40 pressed so that the diameter of thereof is further reduced.

The second piston 50 is screwed to the right end of the bolt screw 30. The right end of the bolt screw 30 has a male thread, and the inner diameter portion of the second piston 50 has a female thread corresponding thereto. As the bolt screw 30 rotates, the bolt screw 30 is moved in or out of the second piston 50 so that the horizontal length defined by the first piston 20, the bolt screw 30, and the second piston 50 together is flexibly variable.

Referring to FIGS. 1 and 3, the spring pack 10 according to the embodiment of the present disclosure includes a spring shaft 11, a spring hold 16, a ring plate 17, and a spring 18.

The spring shaft 11 has a shaft shape that extends in the left and right directions, and is inserted into a hollow accommodation space 22 defined in the first piston 20. The spring shaft 11 is disposed coaxially with the first piston 20, and the right end of the spring shaft 11 is in point contact with the bolt screw 30. The spring shaft 11 according to the embodiment of the present disclosure includes a shaft body part 12, a point contact part 13, a hold fastening part 14, and a rotation restraint part 15.

The shaft body part 12 is an element that forms a basic frame of the spring shaft 11, and has a shaft shape that extends in the left and right directions. The ring plate 17 having a ring shape and the spring 18 are fitted around the shaft body part 12. The point contact part 13 protrudes hemispherically in the right direction from the right end of the shaft body part 12. The point contact part 13 is in point contact with the bolt screw 30.

The hold fastening part 14 is an element to which the spring hold 16 is coupled, and has a male thread formed around the right end of the shaft body part 12. The spring hold 16 has a female thread, and is screwed to the hold fastening part 14 so that the spring hold 16 is fixedly coupled to the right of the hold fastening part 14.

The rotation restraint part 15 is an element for restraining the rotation of the spring shaft 11, and is formed at the left end of the shaft body part 12 while having a polygonal cross-sectional shape. The first piston 20 has a rotation restraint groove 24 formed therein, and the rotation restraint groove 24 has a polygonal cross-sectional shape corresponding to the rotation restraint part 15. The rotation restraint part 15 is inserted into the rotation restraint groove 24 so that its rotation is restrained by the first piston 20.

The rotation restraint part 15 is installed to be slidable in the rotation restraint groove 24, and is disposed at a distance from the left end of the rotation restraint groove 24 in the axial direction of the first piston 20. By the pressing force acting on the spring pack 10, the rotation restraint part 15 is slidable in the left or right direction in the rotation restraint groove 24. The axial direction, the left and right directions, and the moving (sliding) direction described herein all correspond to the left and right directions in FIG. 1.

In this case, the left end of the rotation restraint groove 24 and the left end of the rotation restraint part 15 are kept spaced apart from each other. Thus, the first piston 20 may reliably come into elastic contact with to the shoe 6 at an intensity corresponding to the elastic force of the spring 18 without interference due to the axial contact between the spring shaft 11 and the first piston 20.

The spring hold 16 protrudes radially to be coupled to the spring shaft 11. The spring hold 16 has a ring shape while having a female thread formed on the inner diameter portion thereof, and is screwed to the hold fastening part 14 of the spring shaft 11. This assembly allows the spring hold 16 to be fixedly coupled, in a radially protruding shape, to the right end of the spring shaft 11.

The ring plate 17 is an element for clearly transmitting the elastic force of the spring 18 to the first piston 20. The ring plate 17 has a flat ring shape and is fitted around the spring shaft 11. The ring plate 17 is disposed between the left end of the accommodation space 22 and the spring 18 with the spring pack 10 inserted into the first piston 20, and is in surface contact with the first piston 20.

The spring 18 has a structure in which a plurality of disk springs are axially stacked. The spring 18 is fitted around the spring shaft 11, and is disposed between the ring plate 17 and the spring hold 16. In the state in which the spring pack 10 is inserted into the first piston 20, the right end of the spring 18 is in contact with the spring hold 16, and the left end thereof is in contact with the ring plate 17.

When the spring shaft 11 is pressed to the left by the bolt screw 30, the spring hold 16 coupled to the spring shaft 11 is moved together to the left and the pressing force acts on the spring 18 to the left. In this case, the spring 18 elastically presses the ring plate 17 to the first piston 20, in other words, to the left with the spring 18 supported by the spring hold 16.

Referring to FIGS. 1 and 2, the first piston 20 according to the embodiment of the present disclosure includes a piston body part 21, a fixing member installation part 23, and the rotation restraint groove 24.

The piston body part 21 has a cylindrical shape, and the spring pack 10 is received in the accommodation space 22 defined in the piston body part 21. The right end of the piston body part 21 is open so that the spring pack 10 and the left end of the bolt screw 30 are insertable into the accommodation space 22. The left end of the first piston 20 has a shape of tongs that is in contact with both front and rear of the shoe 6, and is coupled to the shoe 6.

The fixing member installation part 23 is an element to which the fixing member 40 is installed, and is recessed radially on the inner diameter portion of the right end of the piston body part 21. The fixing member 40 is installed to the fixing member installation part 23 with the spring pack 10 and the left end of the bolt screw 30 inserted into the accommodation space 22, thereby preventing the separation of the spring pack 10 and the bolt screw 30 out of the first piston 20.

The rotation restraint groove 24 is an element into which the rotation restraint part 15 of the spring shaft 11 is inserted and installed. The rotation restraint groove 24 is recessed axially on the left end of the accommodation space 22. The rotation restraint groove 24 is formed such that the polygonal end of the spring shaft 11 provided in the spring pack 10 is slidable in the left and right directions in the rotation restraint groove 24.

Referring to FIGS. 1 and 2, the bolt screw 30 according to the embodiment of the present disclosure includes a bolt body part 31, a spring pack pressing part 34, and a moving screw part 37.

The bolt body part 31 is an element that is supplied with a rotational force from the motor 2. The bolt body part 31 extends across the first and second pistons 20 and 50 in the left and right directions. The bolt body part 31 according to the embodiment of the present disclosure includes a rotational force input portion 32 and a movement guide portion 33.

The rotational force input portion 32 is an element that forms a basic frame of the bolt body part 31, and is disposed to extend in the left and right directions between the first piston 20 and the second piston 50. The left of the rotational force input portion 32 is connected integrally with the spring pack pressing part 34, and the right of the rotational force input portion 32 is connected integrally with the moving screw part 37.

The movement guide portion 33 is an element to which the gear member 3 rotated in conjunction with the motor 2 is slidably coupled, and is formed around the rotational force input portion 32 while having a polygonal cross-sectional shape. The gear member 3 according to the embodiment of the present disclosure includes a worm shaft 4 and a worm wheel 5. The worm shaft 4 is connected to the output shaft of the motor 2. The worm wheel 5 is installed around the movement guide portion 33 and engages with the worm shaft 4.

The output shaft of the motor 2 is disposed between the first piston 20 and the second piston 50. The worm shaft 4 is connected to the output shaft of the motor 2 and extends in the forward and rearward directions. The worm wheel 5 is fitted around the movement guide portion 33 in the left and right directions, and rotates in position along with the rotation of the worm shaft 4 when the motor 2 is driven.

The worm wheel 5 has an inner diameter portion corresponding to the polygonal cross-sectional shape of the movement guide portion 33, and is installed around the movement guide portion 33. Thus, when the worm wheel 5 is rotated, the bolt screw 30 is rotated at the same angular displacement as the worm wheel 5. In this case, the moving screw part 37 of the bolt screw 30 is moved in and out of the second piston 50, and the movement guide portion 33 is slidable in the left and right directions through the worm wheel 5.

The spring pack pressing part 34 of the bolt screw 30 is an element for axially pressing the spring pack 10. The spring pack pressing part 34 is formed at the left end of the bolt body part 31 while having a diameter greater than the bolt body part 31, and is in point contact with the spring shaft 11 of the spring pack 10. The spring pack pressing part 34 according to the embodiment of the present disclosure includes a ring latch portion 35 and a point contact recess portion 36.

The ring latch portion 35 of the bolt screw 30 is an element that is latched to the fixing member 40 for binding with the first piston 20, and protrudes radially from the left end of the bolt body part 31. The edge of the ring latch portion 35 is latched to the fixing member 40 protruding inward from the inner diameter portion of the first piston 20, thereby preventing the separation of the ring latch portion 35 out of the first piston 20.

The point contact recess portion 36 is an element that is in point contact with the point contact part 13 of the spring shaft 11, and is recessed on the center of the left end of the ring latch portion 35 facing the spring pack 10. The point contact recess portion 36 has a smaller curvature or a larger diameter than the hemispherical point contact part 13, and has a hemispherical shape in which it is further recessed toward the center thereof.

Thus, the point contact part 13 may be kept in point contact with the point contact recess portion 36 at a point corresponding to the center of the point contact recess portion 36. In this case, the point contact part 13 and the point contact recess portion 36, that is, the spring shaft 11 and the spring pack pressing part 34 are in elastic point contact with each other by the spring 18.

By forming the point contact part 13 and the point contact recess portion 36 as described above, the spring shaft 11 having a linear displacement may stably come into point contact with the bolt screw 30 having a rotational displacement. In addition, it is possible to clearly transmit a load from the bolt screw 30 to the spring shaft 11 and to reduce frictional resistance due to the rotation of the bolt screw 30.

The moving screw part 37 is an element that is screwed to the second piston 50, and is continuously formed at the right end of the bolt body part 31. The moving screw part 37 has a male thread and is screwed to the second piston 50 having a female thread. When the bolt screw 30 rotates, the moving screw part 37 is moved in and out of the second piston 50 so that the horizontal length defined by the first piston 20, the bolt screw 30, and the second piston 50 together is variable to increase and decrease.

Figure 4:
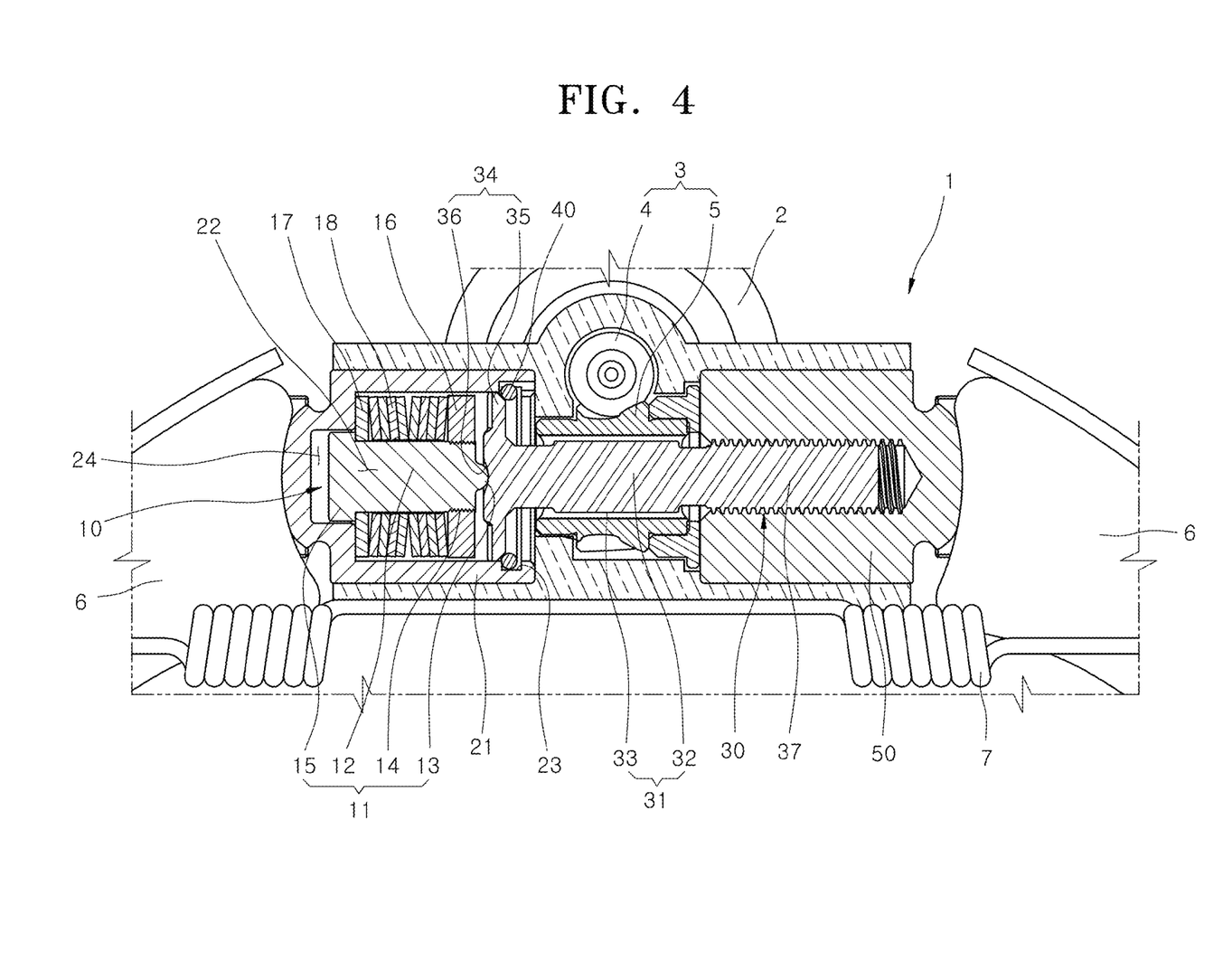
FIG. 4 is a view for explaining a first operating condition of the electronic brake apparatus according to the embodiment of the present disclosure.
Figure 5:
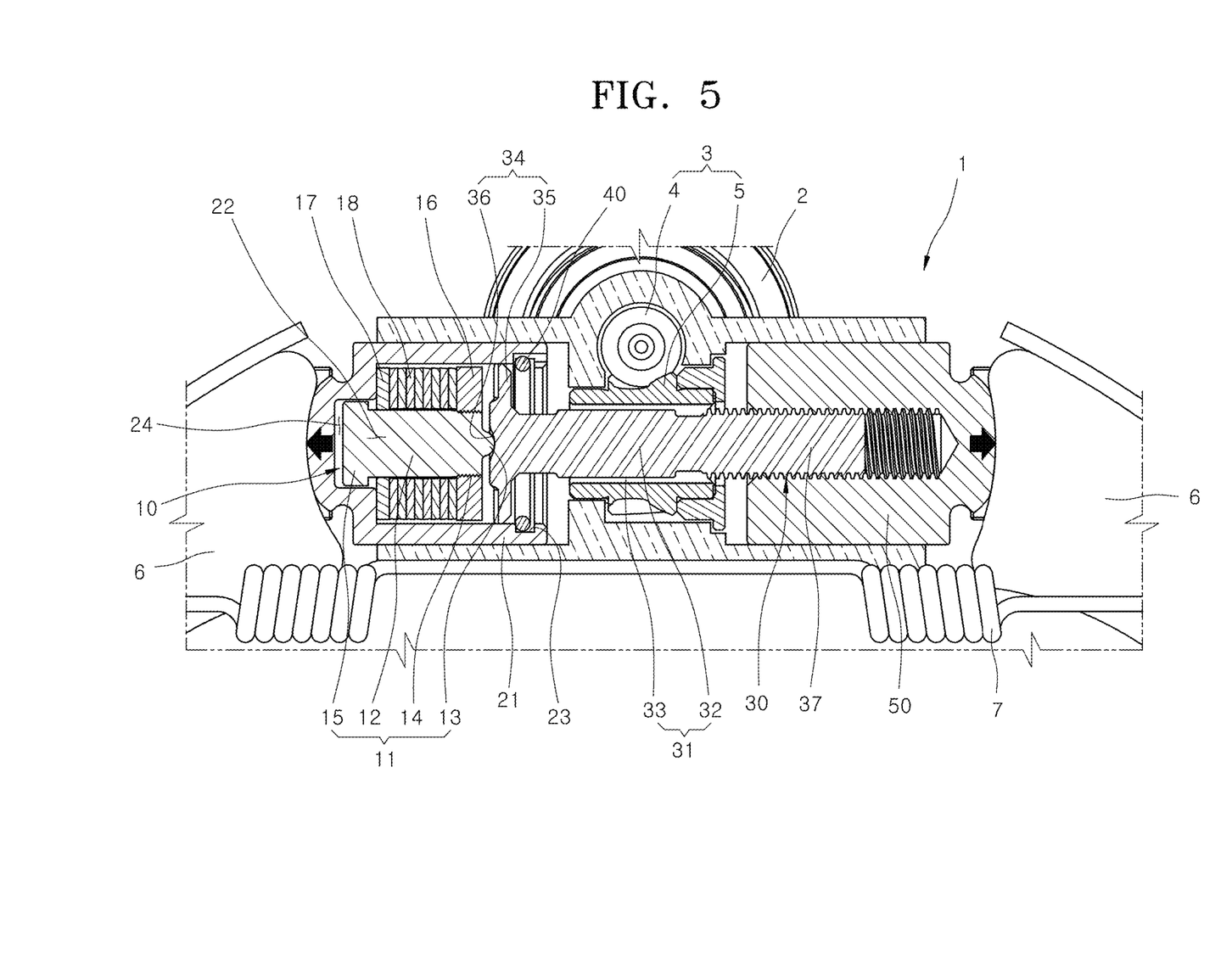
FIG. 5 is a view for explaining a second operating condition of the electronic brake apparatus according to the embodiment of the present disclosure.

FIG. 4 is a view for explaining a first operating condition of the electronic brake apparatus according to the embodiment of the present disclosure. FIG. 5 is a view for explaining a second operating condition of the electronic brake apparatus according to the embodiment of the present disclosure.

Referring to FIGS. 4 and 5, the first piston 20 is in contact with the left shoe 6 of the pair of left and right shoes 6, and the second piston 50 is in contact with the right shoe 6. The pair of left and right shoes 6 are respectively connected to both ends of a return spring 7. The return spring 7 allows its elastic force to continuously act on the pair of left and right shoes 6 in a direction close to each other.

In an initial state as illustrated in FIG. 4, when the bolt screw 30 rotates forward along with the forward driving of the motor 2, the bolt screw 30 is linearly moved out of the second piston 50 while the length defined by the first piston 20, the bolt screw 30, and the second piston 50 together extends further, thereby pushing the pair of shoes 6 in a direction spaced apart from each other, namely, toward the disks (not illustrated) as illustrated in FIG. 5. In this case, the first and second pistons 20 and 50 keep the shoes 6 elastically pressed at an intensity corresponding to the elastic force of the spring 18.

In a state as illustrated in FIG. 5, when the bolt screw 30 rotates in reverse, the bolt screw 30 is moved into the second piston 50 while the length defined by the first piston 20, the bolt screw 30, and the second piston 50 together decreases further as illustrated in FIG. 4, thereby releasing the pressed shoes 6. Upon returning to this initial state, the first piston 20 is pulled to the right with the bolt screw 30 latched to the fixing member 40. Thus, it is possible to clearly and reliably return the first piston 20 to its initial position.

In the state as illustrated in FIG. 5, if the first and second pistons 20 and 50 press the shoes 6 to a high load corresponding to the braking force, the first and second pistons 20 and 50 may be stuck on the shoes 6 by the pressing force. According to the present disclosure, even if such sticking occurs, the first and second pistons 20 and 50 can be smoothly returned to their initial positions by the action of the fixing member 40 as described above.

According to the electronic brake apparatus 1 of the present disclosure having the above configuration, the spring pack 10 and the bolt screw 30 are disposed in series inside the first piston 20 in the axial direction thereof. Therefore, the first piston 20 may have a diameter sufficient to receive the spring pack 10 or the bolt screw 30.

More specifically, according to the present disclosure, compared to the related art having the structure in which the bolt screw, the screw nut, and the elastic member are arranged coaxially with the central axis of the piston, it is not necessary to form a component corresponding to the screw nut and a screw tab corresponding to the male thread of the bolt screw. Therefore, it is possible to further reduce the diameter of the piston member corresponding to the first piston 20 and miniaturize the piston member in size.

Accordingly, according to the present disclosure, it is possible to significantly improve the degree of freedom of vehicle design in arranging vehicle parts in the limited space defined between the pair of shoes 6, and to apply and upgrade the vehicle parts for improving the brake performance. Therefore, it is possible to further enhance the brake performance of the vehicle.

While various embodiments have been described above, it will be understood by those skilled in the art that the embodiments described are by way of example only. It will be apparent to those skilled in the art that various modifications and other equivalent embodiments may be made without departing from the spirit and scope of the disclosure. Accordingly, the true technical protection scope of the disclosure should be defined by the appended claims.

What is claimed is:

1. An electronic brake apparatus comprising:
a spring pack;
a first piston in which the spring pack is mounted;
a bolt screw rotated in conjunction with a motor and having one end in point contact with the spring pack;
a fixing member configured to bind the bolt screw to the first piston; and
a second piston screwed to the other end of the bolt screw.

2. The electronic brake apparatus according to claim 1, wherein the spring pack comprises:

a spring shaft inserted into the first piston and in point contact with the bolt screw;

a spring hold coupled to the spring shaft to be protruded radially;

a ring plate disposed around the spring shaft; and a spring disposed between the ring plate and the spring hold and supported by the spring hold, the spring elastically pressing the ring plate toward the first piston.

3. The electronic brake apparatus according to claim 2, wherein the spring shaft comprises:

a shaft body part;

a point contact part protruding hemispherically from one end of the shaft body part and in point contact with the bolt screw; and a hold fastening part having a male thread formed around the shaft body part, the spring hold being screwed to the hold fastening part.

4. The electronic brake apparatus according to claim 3, wherein the spring shaft further comprises a rotation restraint part formed at the other end of the shaft body part while having a polygonal cross-sectional shape, the rotation restraint part being inserted into a rotation restraint groove formed in the first piston.

5. The electronic brake apparatus according to claim 4, wherein the rotation restraint part is installed to be slidable in the rotation restraint groove, and disposed at a distance from the rotation restraint groove in an axial direction of the first piston.

6. The electronic brake apparatus according to claim 1, wherein the first piston comprises:

a piston body part having an accommodation space defined therein for receiving the spring pack;

a fixing member installation part recessed radially on an inner diameter portion of the piston body part, the fixing member being installed to the fixing member installation part; and a rotation restraint groove recessed axially on an end of the accommodation space, and installed such that a polygonal end of a spring shaft provided in the spring pack is slidable in the rotation restraint groove.

7. The electronic brake apparatus according to claim 1, wherein the bolt screw comprises:

a bolt body part extending across space between the first and second pistons;

a spring pack pressing part formed at one end of the bolt body part and in contact with the spring pack; and a moving screw part formed at the other end of the bolt body part and having a male thread so that the moving screw part is screwed to the second piston.

8. The electronic brake apparatus according to claim 7, wherein the bolt body part comprises:

a rotational force input portion disposed between the first piston and the second piston; and a movement guide portion formed on the rotational force input portion so that a gear member rotated in conjunction with the motor is slidably coupled to the movement guide portion.

9. The electronic brake apparatus according to claim 8, wherein the gear member comprises:

a worm shaft connected to an output shaft of the motor; and a worm wheel installed around the movement guide portion and engaging with the worm shaft, the movement guide portion being slidably coupled to the worm wheel.

10. The electronic brake apparatus according to claim 7, wherein the spring pack pressing part comprises:

a ring latch portion protruding radially from one end of the bolt body part and having an edge latched to the fixing member; and a point contact recess portion recessed on the center of the ring latch portion so that a hemispherical end of a spring shaft provided in the spring pack is in point contact with the point contact recess portion.

11. The electronic brake apparatus according to claim 10, wherein the point contact recess portion has a smaller curvature or a larger diameter than the hemispherical end of the spring shaft, and the point contact recess portion has a hemispherical shape in which it is further recessed toward the center thereof.

12. The electronic brake apparatus according to claim 1, wherein the fixing member has a "C" shape and coupled to an inner diameter portion of the first piston to be protruded inward.

* * * * *